COLOR DEMODULATOR CIRCUIT

Filed June 30, 1966 3 Sheets-Sheet 1

INVENTORS
ROBERT R. ECKENBRECHT &
WILLIAM R. HICKOK
BY Robert E. Strauss
ATTORNEY COLOR DEMODULATOR CIRCUIT
Filed June 30, 1966 3 Sheets-Sheet 2
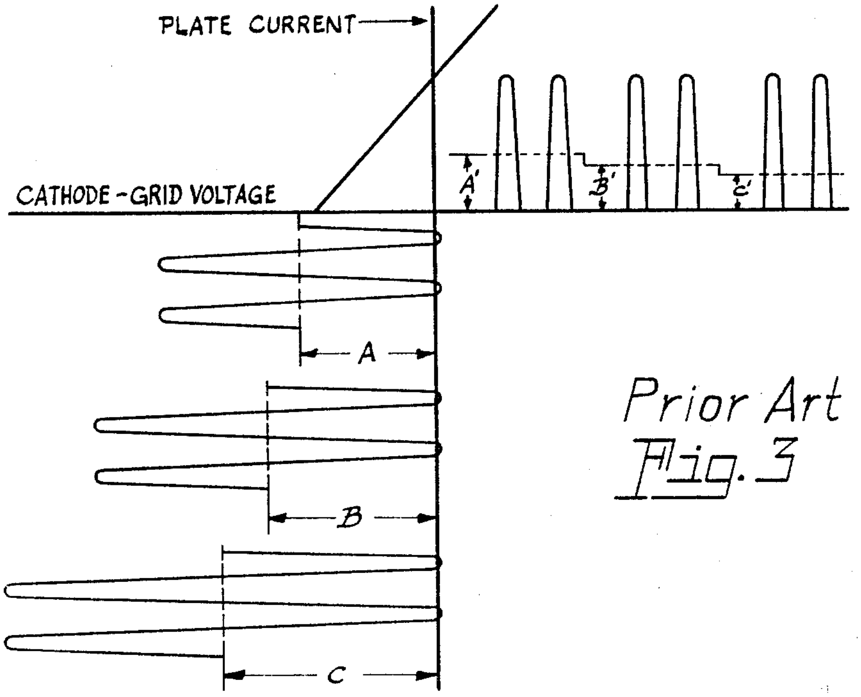
Prior Art Fig. 3
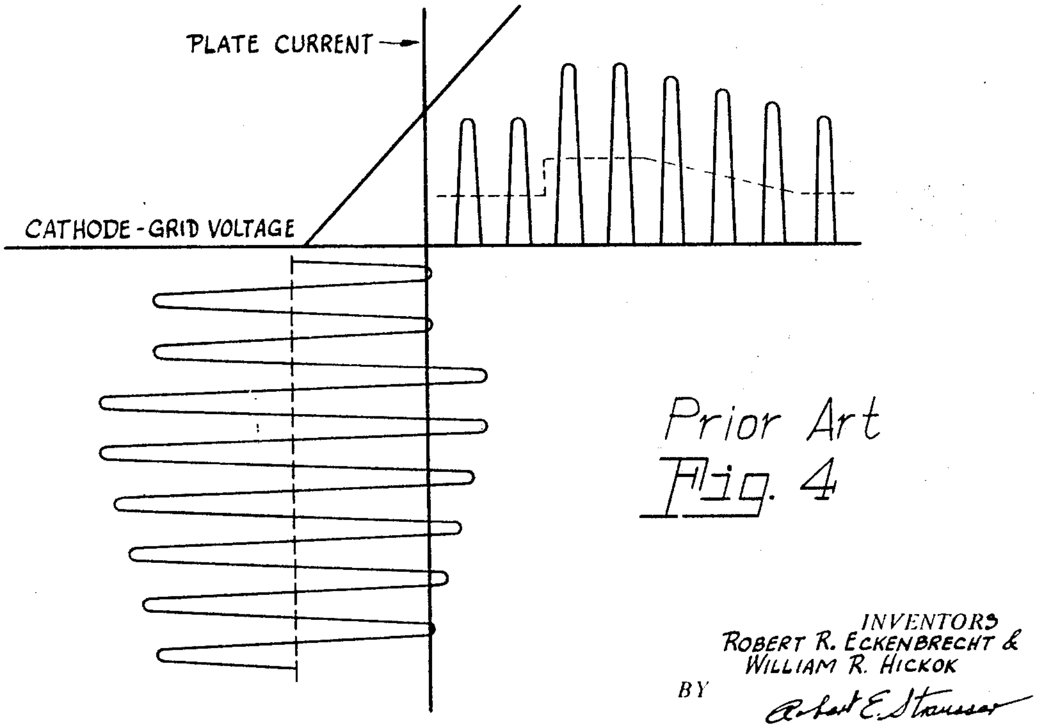
Prior Art Fig. 4
INVENTORS
ROBERT R. ECKENBRECHT &
WILLIAM R. HICKOK
BY
Robert E. Strauser
ATTORNEY

COLOR DEMODULATOR CIRCUIT

Filed June 30, 1966 3 Sheets-Sheet 3

INVENTOR.
ROBERT R. ECKENBRECHT &
WILLIAM R. HICKOK
BY
Robert E. Strauss
ATTORNEY United States Patent Office 3,456,070

Patented July 15, 1969

3,456,070

COLOR DEMODULATOR CIRCUIT

Robert R. Eckenbrecht, Batavia, and William K. Hickok, Williamsville, N.Y., assignors to Sylvania Electric Products Inc., a corporation of Delaware Filed June 30, 1966, Ser. No. 561,976
Int. Cl. H04n 5/38, 5/44
U.S. Cl. 178—5.4 5 Claims

ABSTRACT OF THE DISCLOSURE

Synchronous demodulation circuitry includes an electron device having first and second signal input electrodes with a first bias means coupled to the first input electrode and chrominance signals applied thereto and a second bias means coupled to the second input electrode with reference oscillator signals applied thereto. A rectifier couples the second input electrode to circuit ground and clamps the tips of the oscillator signals thereto regardless of alteration in oscillator signal magnitude. The output signals vary in accordance with variation in the applied chrominance signals and are independent of variations of the reference oscillation signals.

This invention relates to demodulation circuits and more particularly to synchronous demodulation circuits utilized in color television receivers to recover color signals.

The prior art suggests numerous circuits for detecting phase and amplitude variations of a transmitted signal to provide the desired energization of a visual display device. In a well known manner, signals of substantially constant phase and amplitude available from a signal reference oscillator and signals varying in both phase and amplitude available from a chrominance source are applied to an electron device. The electron device is biased in a manner such that conduction occurs only during the peaks of the positive cycle of the reference oscillation signals and the magnitude of current flow in the electron device is proportional to the inphase portion of the applied chrominance signal.

One particular synchronous demoulation circuit of which applicant is aware, suggests an electron tube having the usual cathode, control grid, and anode. A signal of substantially constant amplitude and phase available from a reference oscillation signal source is applied via a bias developing network to the control grid of the electron tube. The bias developing network serves to provide a bias potential for the electron tube. Also, chrominance signals varying in phase and amplitude in accordance with transmitted color signals are applied to the cathode of the electron tube. The phase and amplitude of the chrominance signals are detected in the demodulation circuitry to provide an output signal which is applied to a color cathode ray tube to provide visual reproduction of a scene viewed at the transmitter.

However, it has been found that the above-mentioned prior art demodulation circuitry leaves much to be desired. For example, it has been found that the cathode-control grid of the electron tube acts as a diode detector with respect to the chrominance signals applied to the cathode. In other words, envelope detection of an applied chrominance signal takes place and this detected envelope is amplified and combined with the applied chrominance signal to provide an entirely unwanted signal at the output electrode whereby the colors represented by the applied chrominance signals are undesirably contaminated or altered completely.

Also, it has been found that an amplitude increase, for example, in the signals available from the reference oscillation signal source tend to cause an increase in grid current which in turn causes a shift in the bias potential developed in the grid bias developing network. As a result, the plate current flowing through the electron tube is altered in a manner which may perhaps be described as pulse width modulation whereby the average value of plate current varies in accordance with variations in the reference oscillation signals causing undesired contamination of the colors.

Therefore, it is an object of this invention to provide signal demodulation circuitry for detecting applied chrominance signals and providing output signals representative of the phase and magnitude thereof.

Another object of the invention is to provide demodulation circuitry wherein an output signal available therefrom is dependent upon appiled chrominance signals and substantially independent of variations in applied reference oscillation signals.

Still another object of the invention is to provide demodulation circuitry capable of detecting both positive-going and negative-going variations in applied chrominance signals.

A further object of the invention is to provide demodulation circuitry wherein the tips of applied reference oscillation signals are clamped at substantially the same potential regardless of variations in the magnitude of applied reference oscillation signals.

These and other objects are acheived in one aspect of the invention by demodulation circuitry including an electron device having a first and second signal input electrode and a signal output electrode with a first bias developing means coupled to the first signal input electrode which is coupled to a source of chrominance signals and a second bias developing means coupled to the second signal input electrode which is coupled to a source of reference oscillation signals. Also, means are provided for clamping the peaks of the reference oscillation signals to a substantially constant potential level which is below the potential level at which undesired diode detection of applied chrominance signals by the electron device takes place.

For a better understanding of the present invention, together with other and further objects, advantages, and capabilities thereof, reference is made to the following disclosure and appended claims in connection with the accompanying drawings in which:

FIGS. 3 and 4 are graphic illustrations of the operation of the prior art demodulation circuit of FIG. 2;

Figure 1:
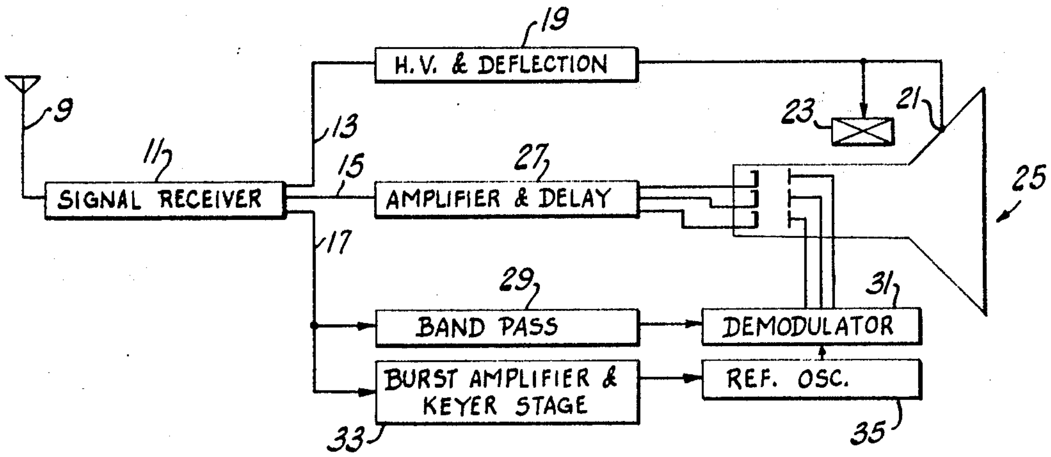
FIG. 1 illustrates, in block form, a color television receiver.

Referring to the drawings, FIG. 1 illustrates a typical color television receiver. Generally, the receiver includes an antenna 9 for intercepting transmitted color television signals which are coupled to a signal receiver, block 11, having the usual RF, IF, and video amplification and detection stages. The signal receiver, block 11, provides a plurality of output signals which are applied to a high voltage circuit 13, a luminance channel 15, and a chrominance channel 17.

The high voltage circuit 13 includes circuitry 19 for developing deflection and high voltages which are applied to the second anode 21 and beam deflection apparatus 23 associated with a color cathode ray tube 25. The luminance channel 15 includes the amplification and delay circuitry 27 wherefrom luminance signals, representative of variations in brightness and contrast as observed at the scene viewed at the transmitter, are applied to the cathodes of the color cathode ray tube 25.

Also, a composite video signal available from the signal receiver, block 11, is applied to the chrominance channel 17. Therein, a bandpass amplifier 29 separates the chrominance signal from the composite video signal and applies this chrominance signal to a demodulation circuit 31. Also an output signal from the receiver, block 11, is applied to a burst amplifier and keyer stages 33 which serve to control a reference oscillator stage 35 wherefrom reference oscillation signals are applied to the demodulation circuit 31. In the demodulation circuit 31, signals representative of the phase and amplitude of the chrominance signals are detected and applied to the control grids of the color cathode ray tube 25.

Figure 2:
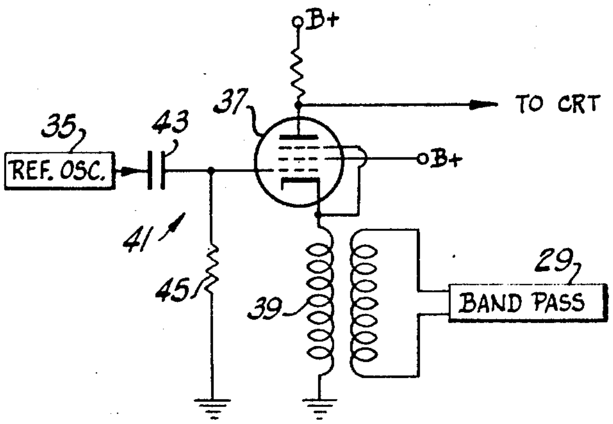
Prior Art Fig. 2
FIG. 2 is a block and schematic illustration of prior art demodulation circuitry.

More specifically, FIG. 2 illustrates a prior art form of demodulation circuitry which will be utilized for purposes of explanation. The demodulation circuitry includes a pentode-type electron tube 37 having the usual cathode, control grid, screen grid, suppressor grid and anode. Chrominance signals available from the bandpass amplifier 29 are applied to the cathode of the electron tube 37 via a transformer secondary winding 39 connected between the cathode and circuit ground. Also, reference oscillation signals available from the oscillator 35 are applied to the control grid of the electron tube 37 by way of a bias developing network 41. This bias developing network 41 includes a capacitor 43 coupling the oscillator 35 to the control grid and a resistor 45 coupling the junction of the capacitor 43 and control grid to circuit ground.

In operation, a reference oscillation signal of substantially constant frequency and magnitude is applied to the control grid of the electron tube 37 via the bias developing network 41. The positive tips of the signal drive the control grid positive causing a flow of grid current through the resistor 45 charging the capacitor 43 and developing a bias potential at a potential level, A of FIG. 3. In turn, plate current is caused to flow through the electron tube having an average current level $A^1$. It is readily understood that an increase in amplitude of the signal available from the reference oscillation signal source would cause an increased grid current flow, an increase in the developed bias potential and an undesired shift in average plate current.

Also, assuming a chrominance signal were applied to the cathode of the electron tube 37, this chrominance signal would tend to drive the control grid more positive causing an increased current flow through the resistor 45 charging the capacitor 43 and developing a bias potential level B and an average plate current level $B^1$. However, the diode action of the cathode-grid of the electron tube 37 would tend to cause development of an undesired bias potential level C causing an unwanted average plate current level $C^1$ due to what might best be described as plate current pulse width modulation. As a result, it can readily be seen that the signal available at the output electrode of the electron device is not representative of a detected chrominance signal and undesired diluted or altered colors are provided by a color cathode ray tube energized by such signals.

Additionally, it should be noted that the above-described operation of the prior art circuit of FIG. 2 relates to the utilization of a bias developing network 41 having a relatively short time constant. However, it has been found that a bias developing network 41 having a relatively long time constant results in a somewhat similar situation when a signal representative of one color appears for an extended period of time. For instance, a signal representative of one color extending over a considerable time period, illustrated in FIG. 4, would initially provide the desired average plate current level at the output of the electron tube 37. Since the signal would cause an increase in grid current, the bias potential developed by the charging of the capacitor 43 would gradually increase causing a gradual decrease in the average plate current level. Thus, the applied chrominance signal would initially provide an output signal representative of the desired color but this desired color would dilute or fade entirely over an extended period of time.

Accordingly, it can be seen that the above-described prior art demodulation circuitry is undesirably affected by diode detection action of the electron tube as well as variations in the reference oscillation signals applied thereto. Moreover, it can be readily understood that any attempt to provide a fixed or constant negative bias potential for the control grid of the electron tube would result in undesired variation in the output signals in accordance with variations in the applied reference oscillation signals.

Figure 5:
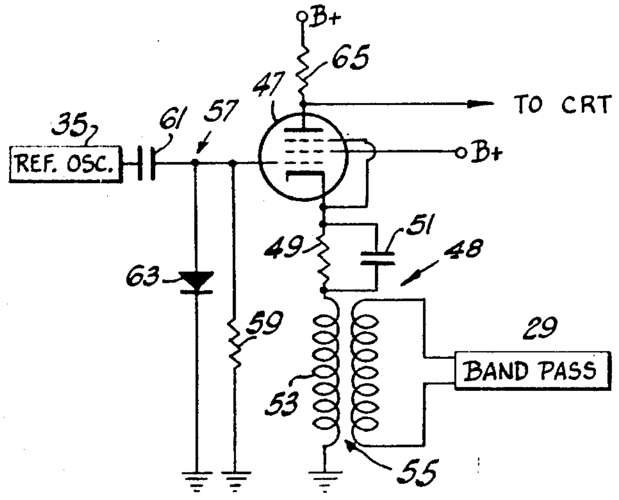
FIG. 5 is a block and schematic representation of one embodiment of an improved demodulation circuit.

Now, refer to the demodulation circuitry embodiment illustrated in FIG. 5. The circuitry includes a pentode-type electron discharge device 47 having a cathode or first signal input electrode, a control grid or second signal input electrode, a screen grid, a suppressor grid, and an anode or signal output electrode. The cathode is coupled to circuit ground via a first bias developing network 48 including a parallel connected resistor 49 and capacitor 51 connected in series with a secondary winding 53 of a transformer 55 in the output circuit of the bandpass amplifier 29.

The control grid of the electron device 47 is coupled to a reference oscillation signal source 35 by way of a second bias developing network 57 including a resistor 59 connected to circuit ground and a capacitor 61 coupling the control grid to the signal source 35. A rectifier 63 couples the junction of the resistor 59 and capacitor 61 to circuit ground. Also, the signal output electrode of the electron device 47 is coupled to a color cathode ray tube and to a voltage source B+ via a resistor 65.

In operation of the demodulation circuitry illustrated in FIG. 5, it may be noted that the rectifier 63 serves, in effect, as a low impedance clamping device shunting the cathode-control grid diode action of the electron device 47. The rectifier 63 clamps the control grid or second electrode and, in turn, the tips of applied reference oscillation signals to circuit ground. Moreover, the tips of the applied reference oscillation signal remained clamped to circuit ground despite variations in magnitude thereof. Also, the first bias developing network 48 is designed to cause development of a bias potential whereat the cathode electrode is at a potential several volts positive with respect to the control grid electrode. Thus, both positive and negative-going chroma signals may be applied to the cathode electrode without danger of driving the control grid electrode positive with respect to the cathode electrode. So long as the applied chroma signals are of a magnitude which does not exceed the magnitude of the bias potential developed by the first bias developing means 48, the control grid electrode will not be driven positive, grid current will not flow, and a bias potential will not be developed by the capacitor 61 "backing off" the electron device 47 because of the applied chroma signals.

Figure 6:
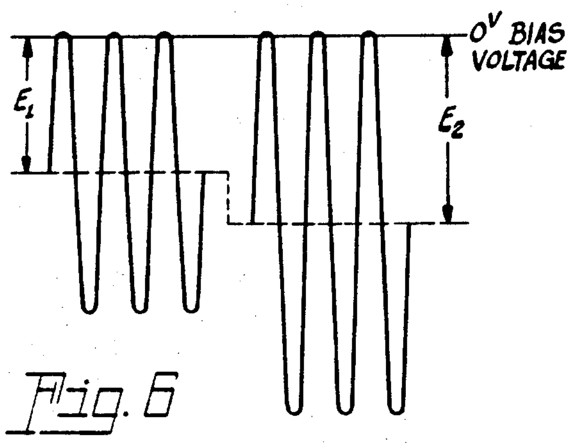
FIGS. 6, 7, and 8 are graphic illustrations of the operation of the embodiment of FIG. 5.
Figure 7:
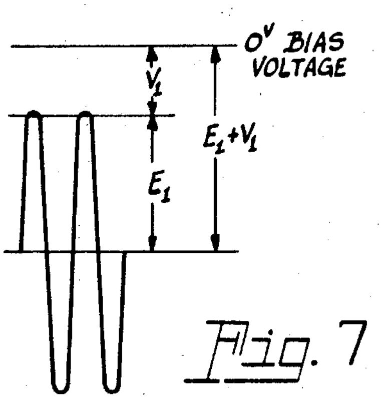
Figure 8:
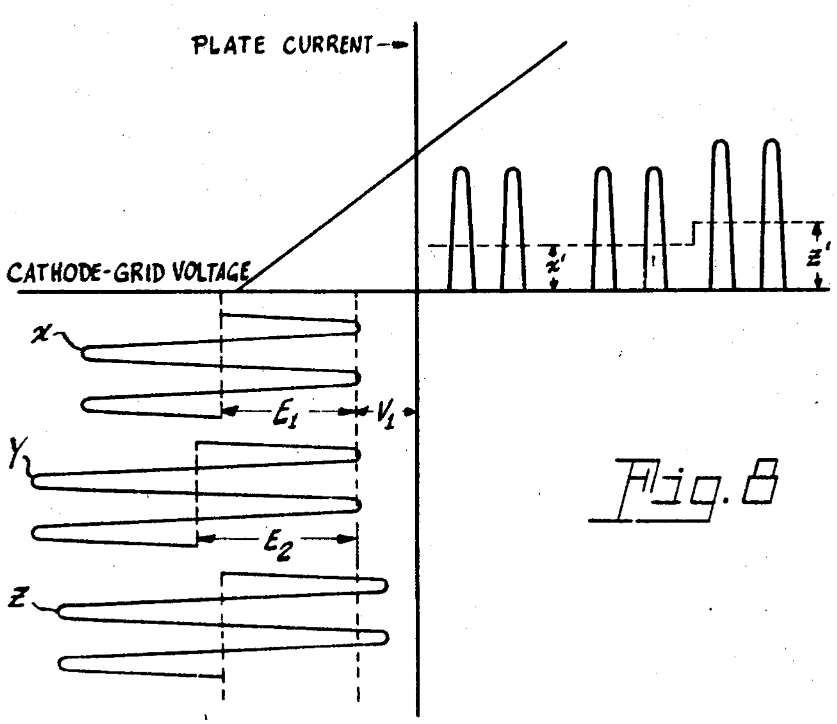

More specifically, FIGURES 6, 7, and 8 serve to graphically illustrate the operation of the embodiment of FIG. 5. In FIG. 6, reference oscillation signals applied to the control grid of the electron device 47 of FIG. 5 will cause development of a bias potential level $E_1$. Also, an increase, for example, in the magnitude of the reference oscillation signals would cause a shift in the bias potential level $E_1$ to a second level $E_2$. However, the tendency for the potential level at the diode 63 to remain substantially unchanged for increased current conduction serves to maintain the peaks of the reference oscillation signals and the average value of plate current flowing through the electron device at substantially the same value.

Since the average value of plate current flow remains substantially constant, the first bias developing network 48 serves to provide a substantially constant bias potential level $V_1$ at the cathode of electron device 47 as illustrated in FIG. 7. Further, the total bias potential between the cathode and the control grid of the electron device 47 will be a summation of the control grid bias potential $E_1$ and the cathode bias potential $V_1$.

Referring to FIG. 8, it can be readily understood that by maintaining the tips of the reference oscillation signals X clamped at the bias potential level $V_1$, there is provided an average plate current $X^1$ at the output electrode of the electron device 47. Also, a shift in the reference oscillation signal magnitude to a waveform Y would shift the bias level from a level $E_1$ to a level $E_2$ without shifting the average plate current level $X^1$.

However, the addition of a chrominance signal to the reference oscillation signal, depending upon the phase relationship, would cause an increased cathode to grid potential Z which, in turn, would cause development of an increased average plate current level $Z^1$ representative of the added chrominance signals. Thus, the average plate current value and the signal available at the output electrode of the electron device 47 is dependent upon variation in the applied chrominance signals and substantially independent of variations in the applied reference oscillation signals.

Therefore, enhanced signal demodulation circuitry suitable for use in a color television receiver has been provided. Therein, the average value of plate current and consequently the signal available therefrom is substantially independent of variations in applied reference oscillation signals and dependent upon applied chrominance signals. Further, the circuitry responds to both positive-going and negative-going chrominance signals to provide output signals appropriate for application to a color cathode ray tube. Moreover, the demodulation circuitry is of simple and economical construction.

While there has been shown and described what is at present considered the preferred embodiment of the invention, it will be obvious to those skilled in the art that various changes and modifications may be made therein without departing from the invention as defined by the appended claims.

What is claimed is:

1. In a color television receiver having a source of chrominance signals and a source of reference oscillation signals, synchronous demodulation circuitry comprising in combination:

an electron device having first and second signal input electrodes and a signal output electrode;

first bias developing means coupled to said first signal input electrode, said means causing development of a substantially constant level of bias potential for said electron device;

means for applying chrominance signals from said source to said first signal input electrode;

second bias developing means coupled to said second signal input electrode, said means causing development of a magnitude of bias potential on said electron device in accordance with the magnitude of signals applied thereto;

means for applying reference oscillations signals from said source to said second bias developing means; and means coupled to said second bias developing means for clamping the peaks of said reference signals applied thereto at a substantially constant potential level whereby signals available at said signal output electrode vary in accordance with variations in the phase and magnitude of said applied chrominance signals and are substantially independent of variations in said applied reference oscillation signals.

2. The synchronous demodulation circuitry of claim 1 wherein said first bias developing means includes a parallel coupled resistor and capacitor coupled to said signal input electrode.

3. The synchronous demodulation circuitry of claim 1 wherein said second bias developing means includes a resistor coupling said second signal input electrode to circuit ground and a capacitor coupling said second signal input electrode to said reference oscillation signal source.

4. The synchronous demodulation circuitry of claim 1 wherein said means for clamping the peaks of said reference oscillation signals includes a rectifier coupling said second signal input electrode to circuit ground.

5. The synchronous demodulation circuitry of claim 1 wherein said means for applying chrominance signals to said first signal input electrode includes a transformer winding in series connection with said first bias developing means, said winding and bias developing means coupling said first signal input electrode to circuit ground.

References Cited

UNITED STATES PATENTS

| | | | |
|---|---|---|---|
| 2,378,999 | 6/1945 | Gillespie | 328—171 |
| 2,519,057 | 8/1950 | Luck | 328—171 |
| 2,845,481 | 7/1958 | Lockhart | 329—50 X |

RICHARD MURRAY, Primary Examiner

JOHN C. MARTIN, Assistant Examiner

U.S. Cl. X.R.

329—50